(12) United States Patent
Chou

(10) Patent No.: US 9,766,477 B1
(45) Date of Patent: Sep. 19, 2017

(54) LENS EXCHANGING STRUCTURE

(71) Applicant: HSIEN CHANG OPTICAL INDUSTRIAL CO., LTD., Tainan (TW)

(72) Inventor: Wen-Hsiung Chou, Tainan (TW)

(73) Assignee: Hsien Chang Optical Industrial Co., Ltd., Tainan (TW)

( * ) Notice: Subject to any disclaimer, the term of this patent is extended or adjusted under 35 U.S.C. 154(b) by 0 days.

(21) Appl. No.: 15/073,916

(22) Filed: Mar. 18, 2016

(51) Int. Cl.
G02C 1/04 (2006.01)
G02C 5/02 (2006.01)
G02C 5/14 (2006.01)

(52) U.S. Cl.
CPC .............. *G02C 1/04* (2013.01); *G02C 5/02* (2013.01); *G02C 5/146* (2013.01); *G02C 2200/08* (2013.01)

(58) Field of Classification Search
CPC ... G02C 1/06; G02C 1/08; G02C 1/10; G02C 5/22; G02C 13/001; G02C 2200/06; G02C 2200/08; G02C 1/04
USPC ......................................... 351/103–109, 154
See application file for complete search history.

(56) References Cited

U.S. PATENT DOCUMENTS

2014/0160422 A1* 6/2014 Chen .................. G02C 1/04 351/105
2014/0327872 A1* 11/2014 Lin .................... G02C 1/04 351/103

* cited by examiner

*Primary Examiner* — Huy K Mai
(74) *Attorney, Agent, or Firm* — Rosenberg, Klein & Lee

(57) ABSTRACT

The invention relates to a lens exchanging structure. Lens-frame assembling parts of a glasses frame of a main spectacle frame are assembled with lens frames. Intercalating flanges on one sides of the lens frames are correspondingly intercalated by intercalating concave parts of the lens-frame assembling parts. Positioning slots on another sides of the lens frames are inserted by positioning bumps of the fixing parts in sliding slots of the glasses frame. Therefore, when the main spectacle frame or the lens frames are needed to be exchanged, it only needs to fiddle the fixing parts to separate the positioning bumps of the fixing parts and the positioning slots of the lens frames. Then, the lens frames can be removed from the main spectacle frame. The removed lens frames can be assembled with other main spectacle frames having other styles and colors.

3 Claims, 6 Drawing Sheets

LENS EXCHANGING STRUCTURE

BACKGROUND

Field of Invention

The disclosure relates to a lens exchanging structure. More particularly, the disclosure relates to a lens exchanging structure that can stably install lenses onto a spectacle frame and conveniently exchange the assembled lenses.

Description of Related Art

At present, when the lenses of the existing spectacle structures need to be exchanged, a special screwdriver is needed to loosen the screws to open the side openings of the spectacle frames. Then, the lenses can be removed. Since the screws are very small, and thus can be easily dropped and lost if assembling and removing the lenses is not performed carefully. Moreover, the threads are very fine, and thus the threads directly applied by a screwdriver can be easily damaged or broken by the improper application of force. Therefore, it is quite inconvenient to assemble or remove lenses, especially for elders. In addition, glasses are an important accessory of people's dresses. People need to wear glasses with suitable style and color to match the costumes thereof according to different attended activities. Since it is not easy to change the lenses of the existing spectacles, consumers need to buy several spectacles and thus it costs much to become an economic burden of the consumers.

SUMMARY

This invention is related to a lenses exchanging structure. When the lenses of the provided lenses exchanging structure need to be exchanged, only the fixing parts of the main spectacle frame is fiddled to separate the fixing parts and the positioning slots of the lenses frames. Then, the lenses frames can be removed from the original spectacle frame and then assembled with another main spectacle frame having other styles and colors. Therefore, the effect of conveniently exchanging lenses can be achieved.

DETAILED DESCRIPTION

Figure 1:
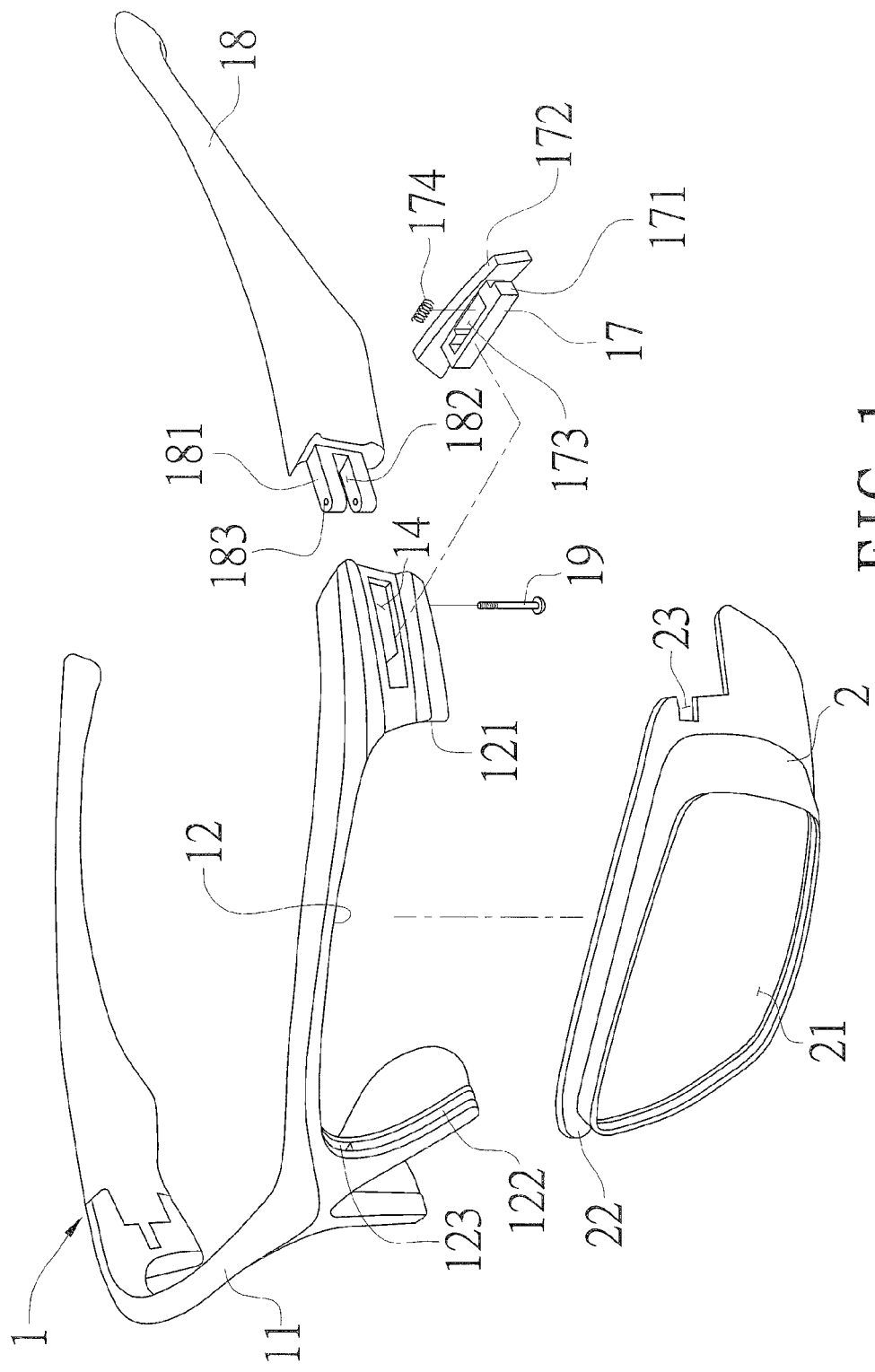
FIG. 1 is a perspective exploded view of this invention.
Figure 2:
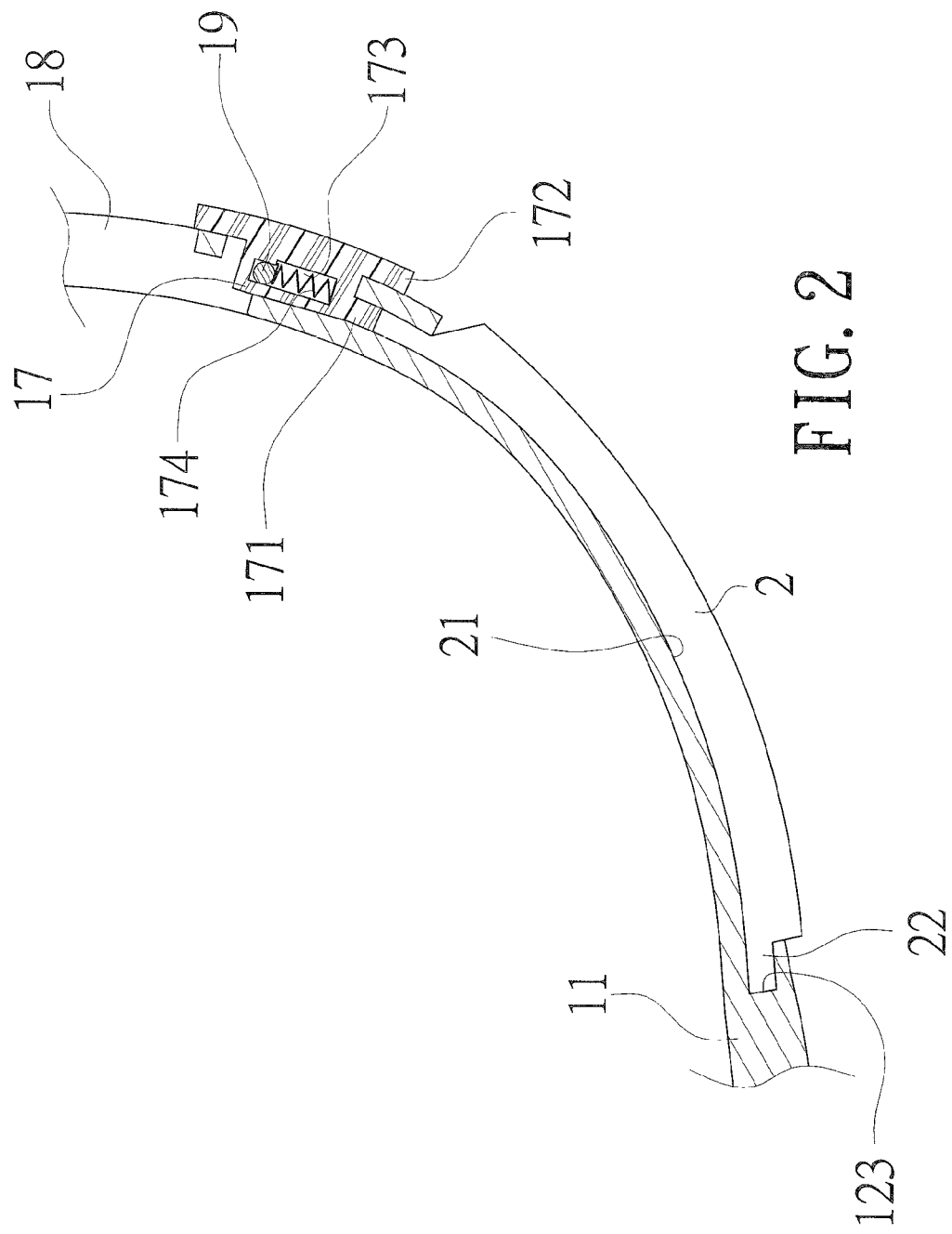
FIG. 2 is a cross-sectional plan view of the assembled state of this invention.
Figure 3:
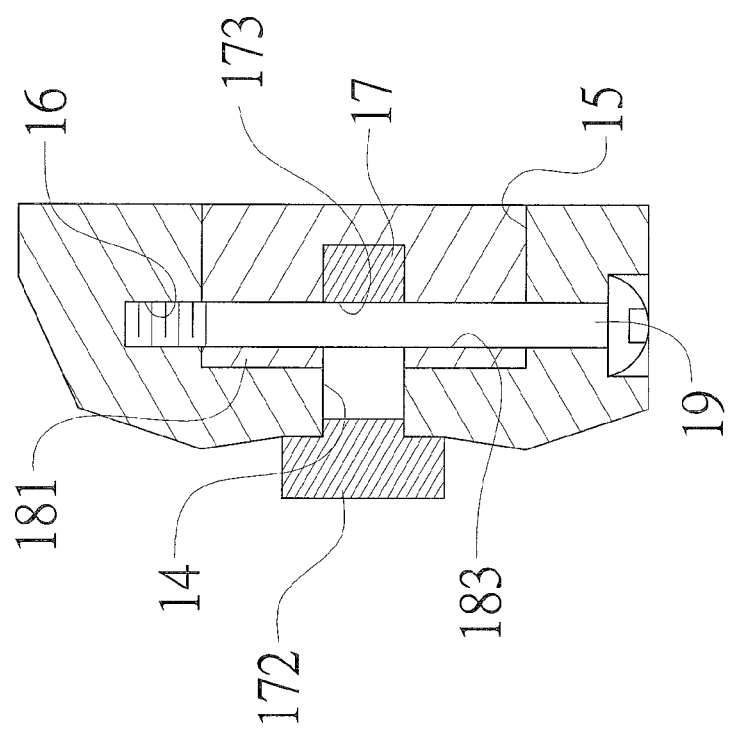
FIG. 3 is a cross-sectional side view of the assembled state of this invention.
Figure 4:
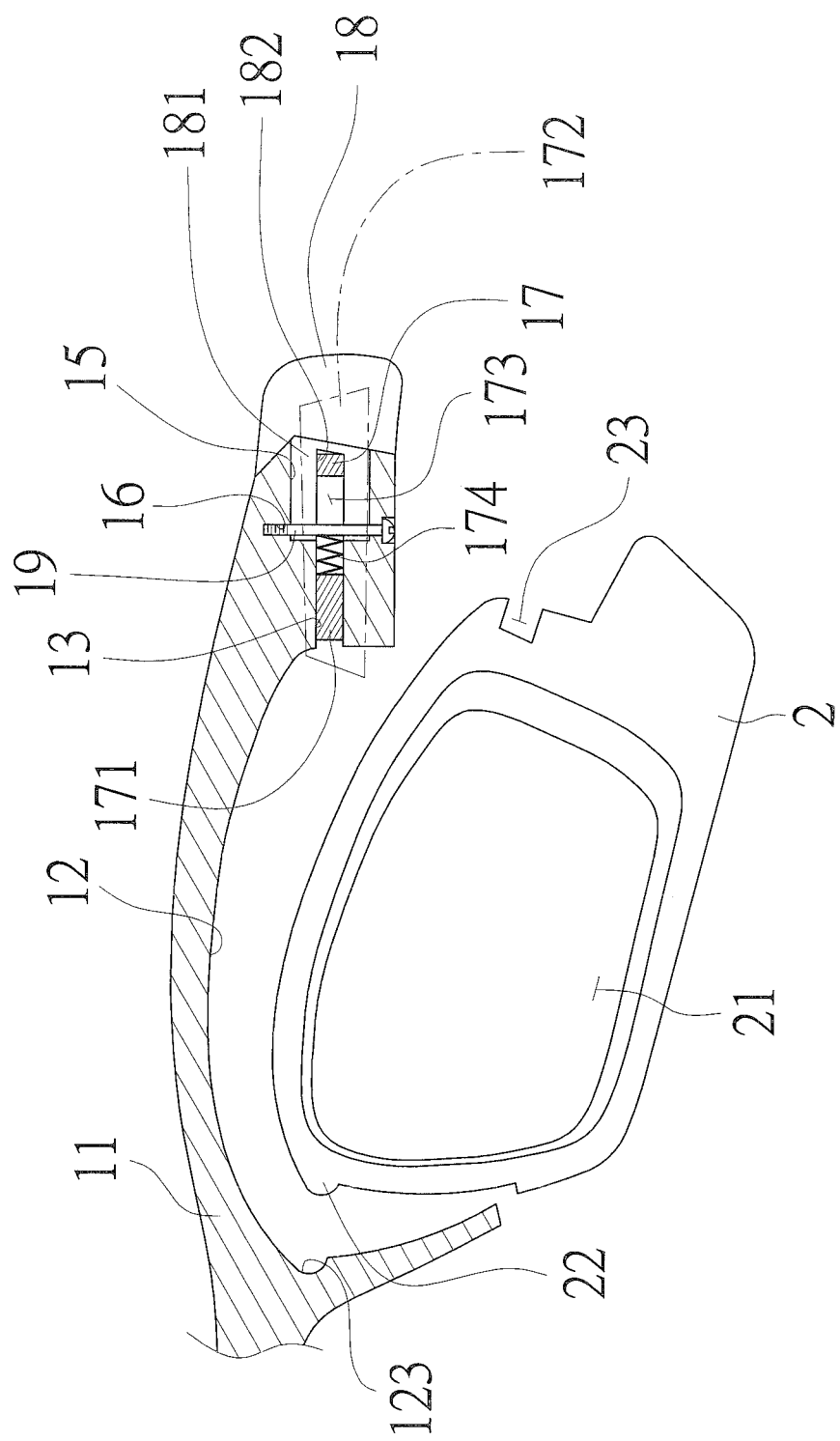
FIG. 4 is a first cross-sectional front view of the assembled state of this invention.

First, please refer to FIGS. 1-4, which show a lens changing structure. The lens changing structure comprises a main spectacle frame and two lens frames 2.

The main spectacle frame 1 has a glasses frame 11 having two lens-frame assembling parts 12. An opening 121 is disposed on the bottom side or the top side of each lens-frame assembling part 12. In this embodiment, the openings 121 are disposed on the bottom sides of the lens-frame assembling parts 12. An intercalating trench 122 is formed along each lens-frame assembling part 12. The intercalating trenches 122 of the lens-frame assembling parts 12 each has an intercalating concave part 123 concavely disposed on one side near the center of the glasses frame 11. The two inner sides of the glasses frame 11 respectively have a sliding slot 13, and one end of each sliding slot 13 extends to the adjacent lens-frame assembling part 12. Two through holes 14 are respectively disposed on the two front sides of the glasses frame 11, and the through holes 14 are communicated with the sliding slots 13. The sliding slots 13 are extended to form connecting slots 15, and the connecting slots 15 are extended to the lateral sides of the glasses frame 11. Locking holes 16 are penetratingly disposed on the two sides of the glasses frame 11 from top to bottom, and the locking holes 16 penetrate the connecting slots 15. Fixing parts 17 are respectively disposed in the sliding slots 13 on two lateral sides of the glasses frame 11. A positioning bump 171 is protrudingly disposed on one end of each fixing part 17, and the positioning bumps 171 are adjacent to the lens-frame assembling parts 12. A toggle sheet 172 is formed on the front side of each fixing part 17, and the toggle sheets 172 are located outside the through holes 14. A long slot hole 173 is disposed to vertically penetrate the top and bottom ends of each fixing part 17. An elastic part 174, such as a spring, is disposed in the long slot hole 173. The two sides of the glasses frame 11 are respectively installed by a temple 18. Front terminals of the temples 18 have connecting sections 181 for connecting the connecting slots 15. Receiving parts 182 are disposed in the center of the connecting sections 181 of the temples 18 to correspond to the sliding slots 13 of the glasses frame 11, and thus the fixing parts 17 can movably slide toward the receiving parts 182 of the temples 18. Locking holes 183 vertically penetrate the connecting sections 181 of the temples 18 to correspond to the locking holes 16 of the glasses frame 11. Two locking parts 19, such as bolts, are disposed to respectively penetrate the locking holes 16 on two sides of the glasses frame 11, the long slot holes 173 of the fixing parts 17, and the locking holes 183 of the temples 18, so that the temples 18 and the glasses frame 11 are pivotally connected. One ends of the elastic parts 174 in the long slot holes 173 of the fixing parts 17 are against the adjacent ends of the positioning bumps 171. The other ends of the elastic parts 174 are positioned to be against the locking parts 19 penetrating the long slot holes 173 of the fixing parts 17.

Two lens frames 2 are installed on the lens-frame assembling part 12 of the glasses frame 11 of the main spectacle frame 1 from the bottom openings 121 of the lens-frame assembling part 12. Two lens assembling holes 21 are respectively disposed on the two lens frame 2 for installing optical lens. An intercalating bump 22 is located on one side of each lens frame 2 to correspondingly intercalate with the intercalating trench 122 of each lens-frame assembling parts 12. A positioning slot 23 is located on the other side of each lens frame 2 to correspond to the position of the sliding slots 13 on two sides of the glasses frame 11. The fixing parts 17 assembled with the two sliding slots 13 are protruded to reach the positioning bumps 171 of the two lens-frame assembling part 12 to respectively against the positioning slots 23 of the two lens frames 2 for insertion and positioning.

Accordingly, the parts above are all assembled. Please refer to FIG. 4. A user uses his or her hand to fiddle the toggle sheets 172 of the fixing parts 17 to move the fixing parts 17 toward the direction of the temples 18 and then slide to the temples 18. At this time, one ends near the positioning bumps 171 of the fixing parts 17 escape from the lens-frame assembling parts 12 of the glasses frame 11. The elastic parts 174 between the end near the long slot holes 173 of the fixing parts 17 and the locking parts 19 are compressed.

Figure 5:
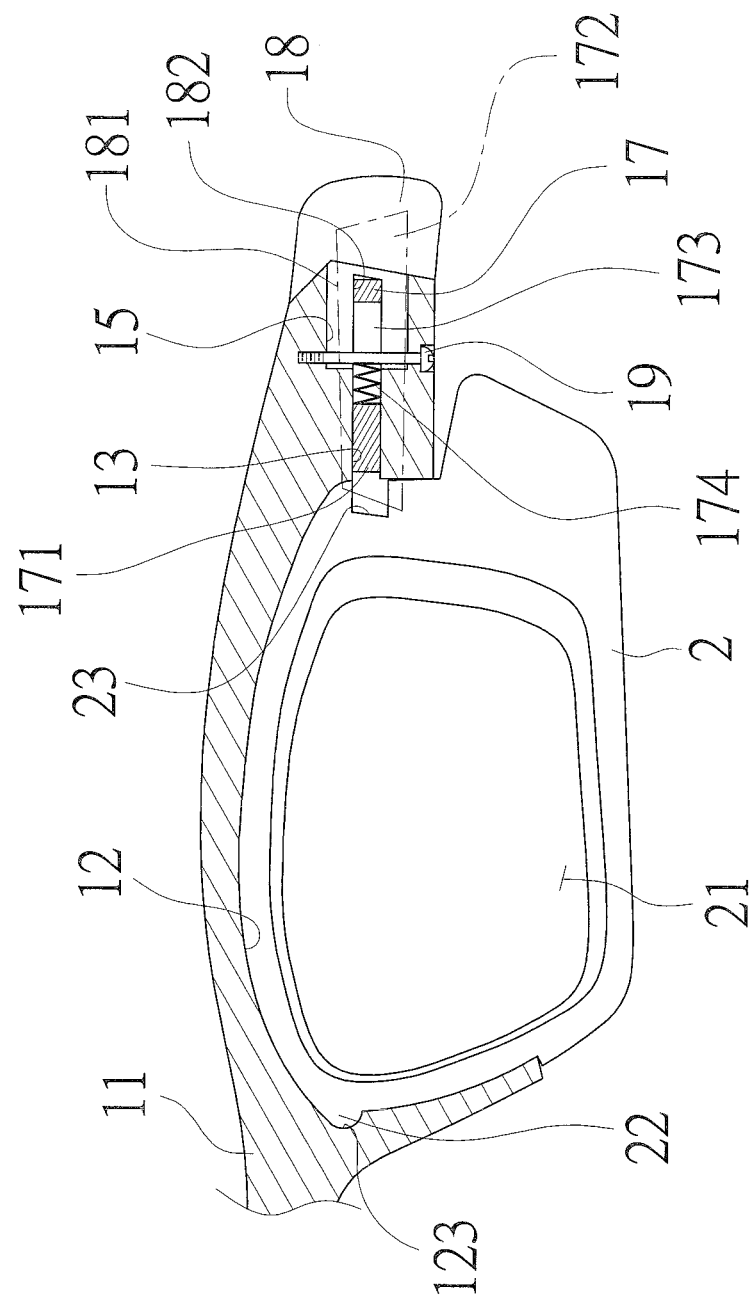
FIG. 5 is a second cross-sectional front view of the assembled state of this invention.

Subsequently, please refer to FIG. 5, the user can assemble the lens frames 2 having optical lens with the two lens-frame assembling parts 12 of the glasses frame 11 of the main spectacle frame 1 sequentially. That is, the intercalating flanges 22 disposed on one sides of the lens frames 2 are intercalated into the intercalating concave parts 123 of the lens-frame assembling parts 12 of the glasses frame 11, and then the edges of the lens frames 2 are intercalated into the intercalating trenches 122 of the lens-frame assembling parts 12. The positioning slots 23 on the other side of the lens frames 2 are positioned to correspond to the positions of the sliding slots 13 of the glasses frame 11.

Figure 6:
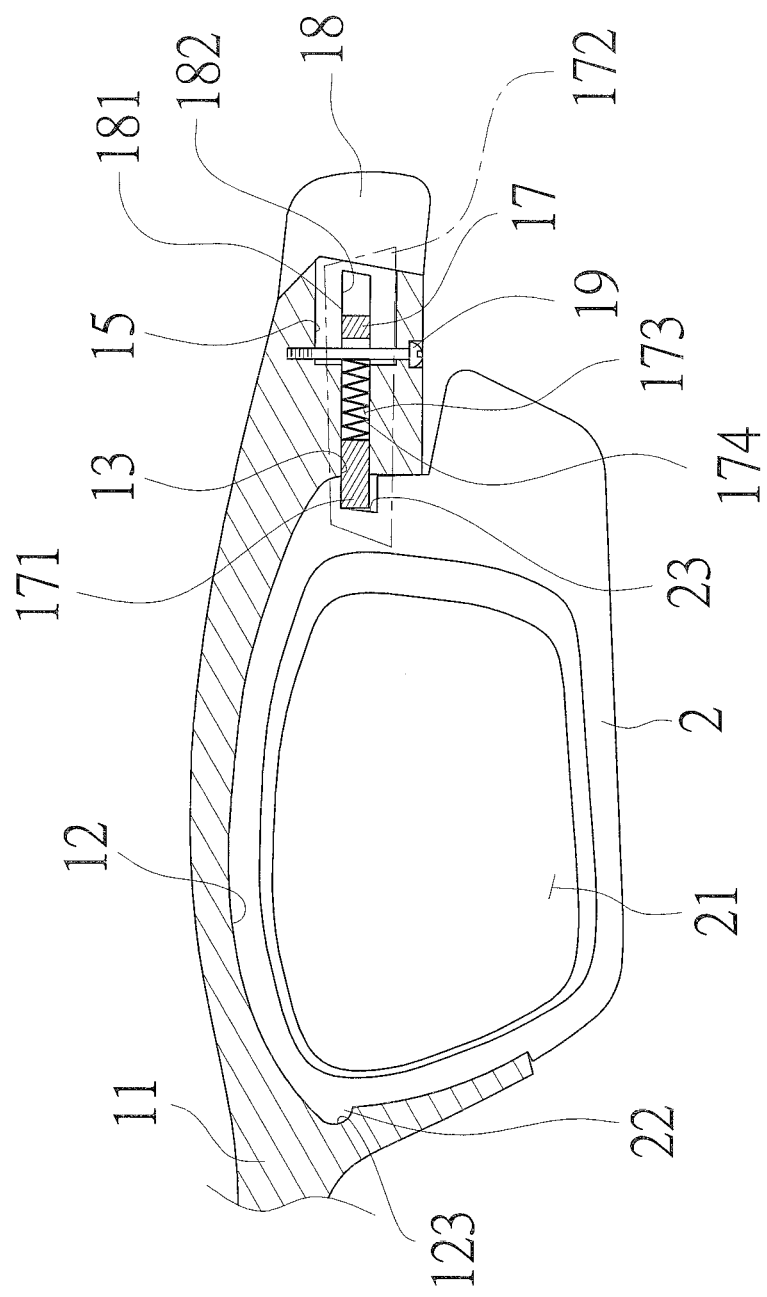
FIG. 6 is a third cross-sectional front view of the assembled state of this invention.

Next, please also refer to FIG. 6. The user can release the fiddling of the fixing part 17. At the same time, the compressed elastic parts 174 in the long slot holes 173 of the fixing parts 17 can restored to their original shape to return the positions of the fixing parts 17. Meanwhile, the ends near the positioning bumps 171 of the fixing parts 17 extend to the sites of the lens-frame assembling parts 12, so that the positioning bumps 17 of the fixing parts 17 can insert into the positioning slots 23 on lateral sides of the lens frames 2 to stably install the lens frames 2 onto the lens-frame assembling parts 12 of the glasses frame 11.

Therefore, the eyesight of the user can go through the lens installed on the lens frames 2 assembled onto the main spectacle frame 1 to prevent the damage from UV or splashing foreign matters according to the lens category installed in the lens frame 2. Furthermore, when the user wants to wear different costumes and choose a main spectacle frame 1 of a suitable style and color according to the attended activity, the lens frames 2 can be removed from the main spectacle frame 1. When the lens frames 2 need to be removed, the user can fiddle the toggle sheets 172 of the fixing parts 172 to make the fixing parts 17 slide toward the direction of the temples 18, and one ends near the positioning bumps 171 of the fixing parts 17 leave the lens-frame assembling parts 12 of the glasses frame 11 to be separated from the positioning slots 23 of the lens frames 2. At this time, the user can remove the lens frames 2 from the lens-frame assembling parts 12 of the glasses frame 11 of the original main spectacle frame 1, and the lens frames 2 can be reinstalled onto another main spectacle frame 1 with a needed style and color. Accordingly, no tools are needed during the lenses exchanging process, and the lens frames 2 can be conveniently assembled on various main spectacle frames 1. Therefore, a user only needs to buy main spectacle frames 1 with various styles and colors to change the appearance of the spectacle for matching the costumes. In addition, a user also can buy different lens frames 2 with lenses of different functions, such as optical lenses, UV lenses or eye-protecting lenses. Then, the user can choose proper lenses according to the purposes of going outside, such as constructing works or outdoor activities, to replace the lens frames 2 with different lenses having different functions to save lots of cost for buying various glasses.

What is claimed is:

1. A lens exchanging structure, comprising:
    a glasses frame of a main spectacle frame having two lens-frame assembling parts, each of the lens-frame assembling parts having an opening on one side thereof, the two lens-frame assembling parts each having an intercalating concave part concavely disposed on one side near a center of the glasses frame, two inner surface portions of the glasses frame respectively having a sliding slot extending to the adjacent lens-frame assembling part, two outer surface portions of the glasses frame respectively having a through hole communicating with the sliding slot, an end of each sliding slot connecting an outwardly extended connecting slot extending to a lateral side of the glasses frame, two sides of the glasses frame having locking holes penetrating the connecting slots, the sliding slots on two sides of the glasses frame respectively having a fixing part, one end of the fixing parts each having a positioning bump being adjacent to the lens-frame assembling part, toggle sheets formed on front sides of the fixing parts and located outside the through holes, long slot holes vertically penetrating the fixing parts from top to bottom, elastic parts disposed in the long slot holes,
    two temples disposed on two sides of the glasses frame, a connecting section formed on a front end of each temple to connect the connecting slots on two sides of the glasses frame, a receiving part being disposed on a center of the connecting section of the temples to correspond to the sliding slot for receiving the fixing part, a locking hole vertically penetrating the connecting section of the temples to correspond to the locking holes of the glasses frame, two locking parts respectively penetrating the locking holes on two sides of the glasses frame, the long slot holes of the fixing parts and the locking holes of the temples to pivotally connect the temples and the glasses frame, wherein one end of each of the elastic parts in the long slot holes bears against one end of one of the long slot holes adjacent the positioning bumps, and another end of each of the elastic parts bears against one of the locking parts penetrating the long slot holes; and
    two lens frames installed in the two lens-frame assembling parts of the main spectacle frame from the openings of the two lens-frame assembling parts, two lens assembling holes respectively disposed on the two lens frames, an intercalating flange and a positioning slot disposed on two sides of each lens frame, the intercalating flange on one side of each of the lens frames being correspondingly inserted into the intercalating concave part of one of the two lens-frame assembling parts, and the positioning slots of the two lens frames respectively corresponding to the sliding slots on two sides of the glasses frame, and the fixing parts assembled with the two sliding slots being extended to the positioning bumps of the two lens-frame assembling parts for respectively and correspondingly inserting into the positioning slots of the two lens frames.

2. The lens exchanging structure of claim 1, wherein the glasses frame of the main spectacle frame further has an intercalating trench along the lens-frame assembling parts, and the peripheral edges of the lens frames are correspondingly intercalated by the intercalating trench of the lens-frame assembling parts.

3. The lens exchanging structure of claim 1, wherein the openings of the lens-frame assembling parts are disposed on a bottom side or a top side of the lens-frame assembling parts.

* * * * *